Sept. 14, 1926.

W. G. PRICE

SIZING MACHINE

Filed Nov. 27, 1923

1,599,714

INVENTOR
William G. Price
By Kay, Totten & Brown,
Attorneys.

Patented Sept. 14, 1926.

1,599,714

UNITED STATES PATENT OFFICE.

WILLIAM G. PRICE, OF YAKIMA, WASHINGTON.

SIZING MACHINE.

Application filed November 27, 1923. Serial No. 677,290.

My invention relates to a fruit or other article sizing machine and has reference more particularly to certain improvements to the machine shown in Letters Patent of the United States, 1,288,184 and 1,325,909 heretofore granted to me.

Figure 1:
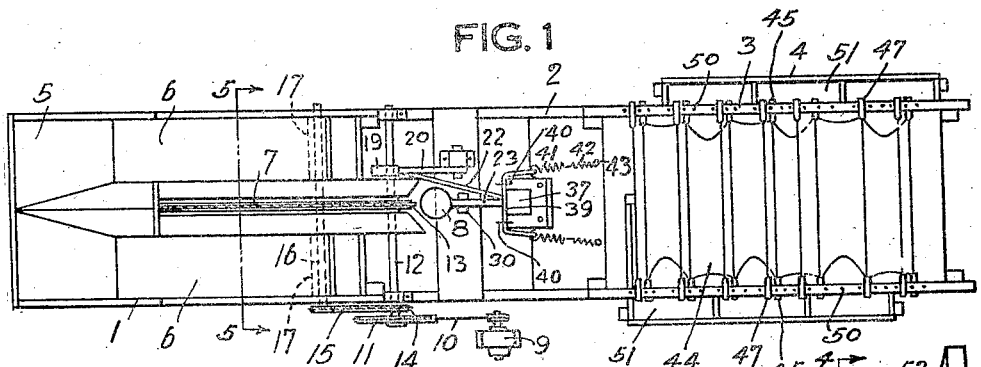
Figure 2:
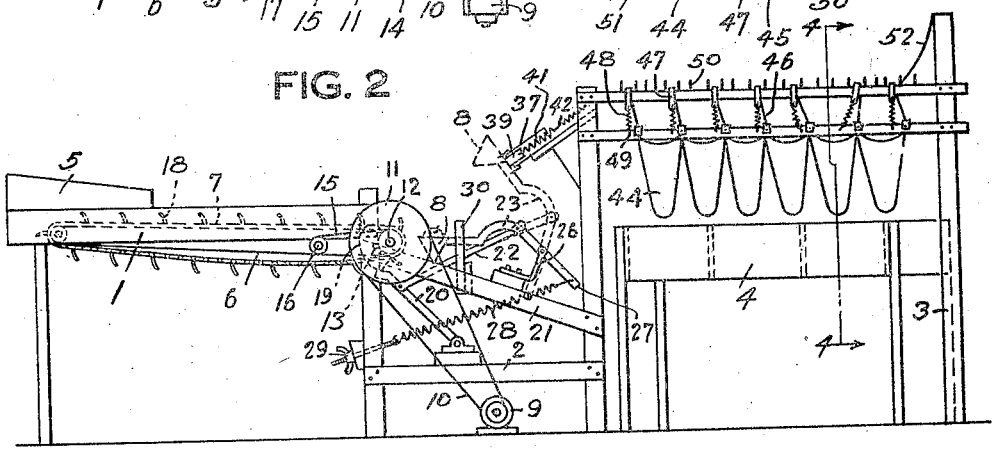
Figure 3:
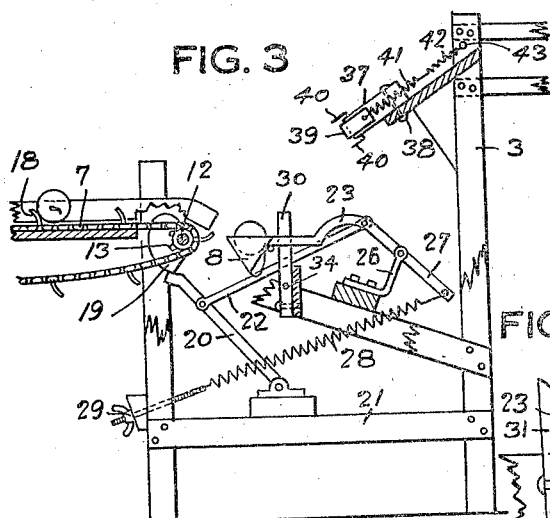
Figure 4:
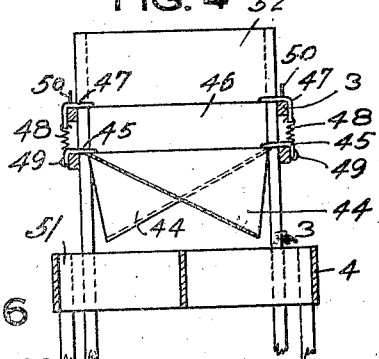
Figure 6:
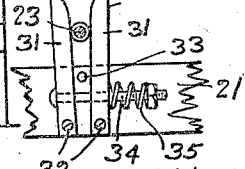
Figure 5:
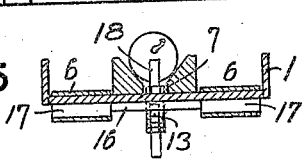

In the accompanying drawing Fig. 1 is a plan view of my improved machine; Fig. 2 is a side elevational view; Fig. 3 is an enlarged longitudinal sectional view showing the outer end of the conveyor and the throwing cup; Fig 4 is a section on the line 4—4, Fig. 2; Fig. 5 is a section on the line 5—5, Fig. 1, and Fig. 6 is a detail of the lower buffer.

In the drawing the numeral 1 designates a suitable sorting table, 2 the tossing machine frame, 3 the catcher-frame, and 4 the receiving bins, all as comprised in my patents above set forth.

The numeral 5 indicates a suitable receiving hopper from which the articles to be sized are delivered to the sorting table. While my invention is not limited to the sizing of fruit, I will for convenience use that term in describing the invention.

Moving belts 6 are provided from which the fruit is sorted by hand and delivered to the chain feeding-belt 7 which carries the sorted fruit to the tossing-cup 8. The chain feeding-belt 7 is driven in the following manner; an electric motor 9 drives the belt 10 which drives the pulley 11 attached to the shaft 12. The shaft 12 carries the 6-tooth sprocket 13 which drives the feed-belt 7. A pulley 14 on the shaft 12 drives the belt 15 which drives the shaft 16 carrying pulleys 17, which in turn drive the sorting-belts 6.

The chain feeding-belt 7 is provided with the curved lugs 18 which deliver the fruit one by one to the tossing cup 8, said lugs being curved in a direction opposed to the movement of the belt so that said lugs act to roll the fruit along, the backwardly curved and sloping lug tending to work beneath the fruit, thus carrying a portion of its weight, and relieving it of any frictional binding engagement with the walls of the guide as it is moved along by the conveyor, and the rolling movement thus imparted to the fruit exposing practically the entire surface of the fruit in order to permit the sorter to see whether the fruit bears any imperfections or worm-holes.

The shaft 12 carries the cam 19 which is adapted to engage the cam-lever 20 pivoted to the tosser frame 21. The cam-lever 20 is pivoted to the tie-rod 22 and said tie-rod is pivoted to the cup-arm 23, said cup-arm in turn being pivoted to the tosser-frame 26. The cup-arm has an extension 27 to which is attached the spring 28, which in turn is attached to the tosser-frame by the adjusting-nut 29.

A buffer 30 is provided to take care of the return shock of the tossing-cup 8, said buffer comprising two pinching fingers 31 preferably made of hard-wood, which are pivoted at 32, and said fingers are limited in their movement toward each other by the stop 33. The bolt 34 and the spring 35 limit the movement of the fingers 31 away from each other and provide means for the adjustment of the pressure of the fingers 31 against the cup-arm 25. The cup-arm 25 is shown in section between the pieces 31 at Fig. 6.

The upper buffer-block 37 which is adapted to reduce the shock of the upward travel of the tossing-cup is U-shaped, and is secured to the tosser-frame 2 by the bolt 38. A strap 39 of leather or other suitable material is secured to the buffer-block 37, guiding lugs 40 being provided for said strap to hold it in position. The strap 39 is held taut by the springs 41 and 42 which are attached to the tosser-frame by screw-eyes 43.

The catching-frame carries the inclined flexible catching chutes 44 made of canvas or other suitable material, which are inclined to discharge alternately in opposite directions, and are spaced apart as indicated in Fig. 2. The tops of the chutes 44 which are open to receive the fruit, are rigidly connected by nails or other suitable fastening devices to the frame 3 through the straps 45. Wing-pieces of canvas 46 are sewed to the top edges of the chutes 44 and are supported by straps 47 which pass over the top of the frame 3, and are attached to the springs 48 which are connected to screw-eyes 49 in the frame 3.

A plurality of pins 50 in the top of the frame 3 provide means for adjusting the straps 47 to different positions, and consequently the tops of the wings 46 in order to vary the inlets to the chutes 44 whereby the quantity and size of the fruit which will fall into any one of the bins, may be varied.

The receiving bins 4 are provided with as many pockets 51 as there are discharging chutes.

The curtain 52 stops the flight of the various small pieces of fruit and causes them to fall into the chute at the foot of said curtain.

In the operation of the machine the fruit is picked by the sorters from the sorting table and placed in position to be picked up by one of the curved lugs 18 on the feed-chain, and as stated above, the sprocket wheel 13 has six lugs which engage the sprocket-chain 7 and the curved lugs 18 are spaced six links apart, and as only one piece of fruit is carried by each lug 18, the tossing-cup 18 is pulled down to its fruit-receiving position, and one piece of fruit is delivered into it by one of the lugs 18 at each revolution of the shaft 10. The lugs 18 push the articles one by one along the guides into the cup, and the cam 19 releases the cup the same instant as the fruit strikes the cup, thereby greatly increasing the speed of operation.

In my former patented machines the fruit was dropped into the cup and an interval of time allowed for the fruit to settle in the cup before the cup was released by the cam to toss it. This method caused a slow operation of the machine as only about eighty pieces of fruit could be sized per minute. By using only one cam and running the shaft 12 at a speed of 160 revolutions per minute, 160 pieces of fruit such as apples, peaches and pears, are discharged by the lugs 18 at high speed into the cup. The cam 19 is adjusted to release the lever 20, and consequently the cup, the same instant that the apple strikes the cup, and this construction enables the increase in sorting capacity as above set forth.

The fingers 31 of the lower buffer 30 pinch the cup-arm 25 as it is swinging down to the position for receiving the fruit, and the resulting friction between the buffer and the cup-arm prevents said cup-arm and cup from vibrating and holds it motionless and always at precisely the same height or location when receiving the fruit which is necessary to secure accurate sizing.

The upper buffer 37 stops the upward swing of the cup-arm and cup when the cup is pulled up by the spring 28. The cup-arm strikes the leather straps 39 which are stressed by the springs 41 and 42, and the resistance of these springs and the friction of the leather strap around the end of the U-shaped buffer-block 37, checks and stops the upward swing of the cup and arm without jarring, and with practically no noise. In order to make such a buffer operate without jarring, it is necessary to use weak springs 42, but if these weak springs 42 are attached directly to the ends of the leather strap 39, the jerk on the strap produced by the cup-arm striking it, might tend to break the springs 42, and accordingly it has been found advisable to relieve the part of the shock on the weak springs 42 by inserting one or more progressively stronger springs 41 between the springs 42 and the leather strap 39.

In my patented sizing machine above referred to, the canvas catching chutes 44 were supported by springs and these springs were necessarily strong enough to support the tops of the chutes in a horizontal position. Springs strong enough to support the chutes were also so strong that their resilient action would frequently throw a piece of fruit when it struck near the upper edge of a chute in a reverse direction into another chute which caused inaccurate sizing. To overcome this defect in the present invention, I have securely fastened the tops of the chutes 44 to the frame 3 by means of connecting straps 45 which are nailed to the frame 3. The springs 48 connected to the wings 46 are only strong enough to hold the top edge of the wings in a horizontal line and have not sufficient resilient action to toss any fruit striking said wings into the wrong chute.

What I claim is:—

1. In a sizing machine, the combination of an oscillatory tossing-cup, an arm connected to said cup, means for oscillating said cup, and a buffer for the arm of said cup adapted to check the vibrations of the cup comprising retarding means for frictionally engaging with said arm.

2. In a sizing machine, the combination of an oscillatory tossing-cup, an arm connected to said cup, means for oscillating said cup, and a buffer adapted to check the vibrations of said cup, said buffer comprising the two arms arranged for frictionally engaging with said first arm from opposite sides thereof.

3. In a sizing machine, the combination of an oscillatory tossing cup, an arm connected to said cup, means for oscillating said cup, and a lower buffer adapted to check the vibrations of said cup, said buffer comprising spring actuated pinching fingers.

4. In sizing apparatus, the combination of an oscillatory tossing-cup, means for oscillating said cup, an arm connected to said cup, an upper buffer in the path of said arm comprising a U-shaped buffer block, a flexible strap-member, and springs connected to said strap-member.

5. In a sizing machine the combination of an oscillatory tossing-cup, means for oscillating said cup, an arm connected to said cup, an upper-buffer in the path of said arm, said buffer comprising a U-shaped block, a flexible strap-member engaging said block, and a plurality of tension springs of successively decreasing strength connected to said strap to hold same in engagement with said block.

6. In a sizing machine, the combination of a tossing-cup, a supporting frame, catcher chutes rigidly supported on said frame, wings attached to the tops of said chutes, the tops of said wings being flexibly supported on said frame, and means for adjusting the tops of said wings in different positions on said frame.

7. In a sizing machine, the combination of a tossing-cup, a supporting frame, catcher chutes supported on said frame, wings, straps connected to said wings and engaging said frame, and springs connected to said straps and to said frame.

8. In a sizing machine, the combination of a tossing-cup, a supporting frame, catcher chutes supported on said frame, wings attached to said chutes, the tops of said wings being flexibly supported on said frame, and adjusting pins on said frame for adjusting the position of the top edges of said wings.

9. In a sizing machine, the combination of an article tossing cup, a supporting frame, chutes supporting the said frame, wings connected to said chutes, and the tops of said wings flexibly supported on said frame.

In testimony whereof I, the said WILLIAM G. PRICE, have hereunto set my hand.

WILLIAM G. PRICE.